(12) United States Patent
Yu

(10) Patent No.: US 7,596,304 B2
(45) Date of Patent: Sep. 29, 2009

(54) STARTING DEVICE AND METHOD FOR ELIMINATING A PEAK CURRENT

(75) Inventor: Shou-Te Yu, Taoyuan (TW)

(73) Assignee: Delta Electronics Inc., Taoyuan Sien (TW)

( * ) Notice: Subject to any disclaimer, the term of this patent is extended or adjusted under 35 U.S.C. 154(b) by 2083 days.

(21) Appl. No.: 09/768,526

(22) Filed: Jan. 24, 2001

(65) Prior Publication Data

US 2002/0097021 A1 Jul. 25, 2002

(51) Int. Cl.
*H02P 5/06* (2006.01)

(52) U.S. Cl. .................. 388/806; 318/779; 388/800; 388/801; 388/802; 388/803; 388/804; 388/805; 388/847

(58) Field of Classification Search ........... 318/778, 318/779, 799, 811, 847, 800–806
See application file for complete search history.

(56) References Cited

U.S. PATENT DOCUMENTS

| | | | | |
|---|---|---|---|---|
| 3,409,814 A | * | 11/1968 | Azuma et al. ............... 388/811 |
| 3,876,919 A | * | 4/1975 | Kearns ..................... 388/819 |
| 4,034,274 A | * | 7/1977 | Akima ...................... 388/816 |
| 4,037,145 A | * | 7/1977 | Bailey et al. ............... 388/811 |
| 4,121,141 A | * | 10/1978 | Frazee ..................... 388/819 |
| 4,149,116 A | * | 4/1979 | Minakuchi ................. 388/820 |
| 4,259,628 A | * | 3/1981 | Iwakane et al. ............. 318/799 |
| 4,291,355 A | * | 9/1981 | Dinger .................... 361/31 |
| 4,465,961 A | * | 8/1984 | Landino | |

* cited by examiner

*Primary Examiner*—Rita Leykin
(74) *Attorney, Agent, or Firm*—Thomas, Kayden, Horstemeyer & Risley

(57) ABSTRACT

Disclosed is a starting device and method for eliminating a peak current introduced when an inductive circuit such as a motor or a direct-current (DC) motor is actuated, The starting device includes a signal generator electrically connected to the inductive circuit and generating a first signal corresponding to a signal output by the inductive circuit, a comparative circuit electrically connected to the signal generator for converting the first signal to a second signal to be compared with a reference signal to generate a control signal, and a controlling device electrically connected with the inductive circuit and the comparative circuit for receiving the control signal and gradually increasing a current input into the inductive circuit corresponding to the control signal, thereby eliminating the peak current introduced when the inductive circuit is actuated.

20 Claims, 3 Drawing Sheets

STARTING DEVICE AND METHOD FOR ELIMINATING A PEAK CURRENT

FIELD OF THE INVENTION

The present invention is related to a starting device and method for eliminating a peak current, and especially to a starting device and method adapted to be used with an inductive circuit such as a direct-current (DC) motor for eliminating a peak current introduced when the motor is actuated

BACKGROUND OF THE INVENTION

Generally, the structure of a motor has mechanical connections of brush and commutator so that when a motor is initially started, a peak current will be always introduced into the motor. This phenomenon results from an improper layout of electric wires and a poor performance of power source. In the past, there is no buffer circuit to prevent the occurrence of peak current. Because the motor is suddenly started from the stationary state, the peak current will bring about a big mechanical shock in the motor thereby resulting in the damage of the motor.

Recently, some methods for eliminating this phenomenon are proposed. One of these methods is to use a protective circuit, such as a capacitor or a variable resistor, disposed near the power source of the motor to protect the motor after a peak current is introduced, but this protective circuit will also be damaged after being used for a long lime. Another method is to stagedly start the motor through a complicated and expensive circuit, for example, using a circuit including a plurality of filters to start the motor by generating a pulse width modulation (PWM) signal to be output to the transistor, wherein the switched interval of the transistor is changed along with a variation of the duty cycle of the PWM signal thereby changing the average current flowing through the motor to further control the rotation speed of the motor. However, such a way of stagedly starting the motor needs a complicated and expensive PWM circuit. In addition, this PWM circuit will introduce an electroacoustic sound while the motor is started and the reliability of internal electronic parts will also be affected under multiple impulsions.

Therefore, it is desirable to develop a simplified and economical starting device and method for improving the above-described defects of the prior art.

SUMMARY OF THE INVENTION

An object of the present invention is to provide a starting device for eliminating a peak current introduced when an inductive circuit (for instance, a motor and a direct-current (DC) motor) is actuated, Another object of the present invention is to provide a simplified and cheap starting device for eliminating a peak current introduced when an inductive circuit is actuated without affecting the reliability of internal electronic parts.

According to the present invention, the starting device includes a signal generator electrically connected to the inductive circuit and generating a first signal corresponding to a signal output by the inductive circuit; a comparative circuit electrically connected to the signal generator for converting the first signal to a second signal to be compared with a reference signal so as to generate a control signal; and a controlling device electrically connected with the inductive circuit and the comparative circuit for receiving the control signal and gradually increasing a current input into the inductive circuit corresponding to the control signal, thereby eliminating the peak current introduced when the inductive circuit is actuated.

Preferably, the signal generators is a frequency generator and the first signal is a periodic square-wave signal having a frequency proportional to a rotation speed of the motor.

In accordance with one aspect of the present invention, the comparative circuit includes a signal converter electrically connected to the signal generator for converting the first signal to the second signal; and a comparator electrically connected to the signal converter for comparing the second signal with the reference signal to output a control signal or a pulse width modulation (PWM) signal.

The signal converter can be a triangular wave generating circuit for converting the square-wave signal to a triangular wave signal or a sawtooth wave signal to be compared with the reference signal.

In addition, the starting device further includes a charging circuit or a resistance-capacitance circuit electrically connected between the comparator and a voltage source used for supplying the inductive circuit with a required voltage, and providing the reference signal.

In another embodiment of the present invention, the starting device further includes a driving circuit electrically connected between the inductive circuit and the signal generator for driving the inductive circuit.

The controlling device can be an electronic switch or a transistor for gradually increasing the current flowing through the inductive circuit corresponding to the control signal.

Another yet object of the present invention is to provide a starting method for eliminating a peak current introduced when an inductive circuit is actuated.

The starting method includes the steps of (a) providing a first signal corresponding to a signal output by the inductive circuit; (b) converting the first signal to a second signal to be compared with a reference signal for generating a control signal; and (c) gradually increasing a current flowing through the inductive circuit corresponding to the control signal, thereby eliminating the peak current introduced when the inductive circuit is actuated.

The present invention may best be understood through the following description with reference to the accompanying drawings, in which:

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

Figure 1:
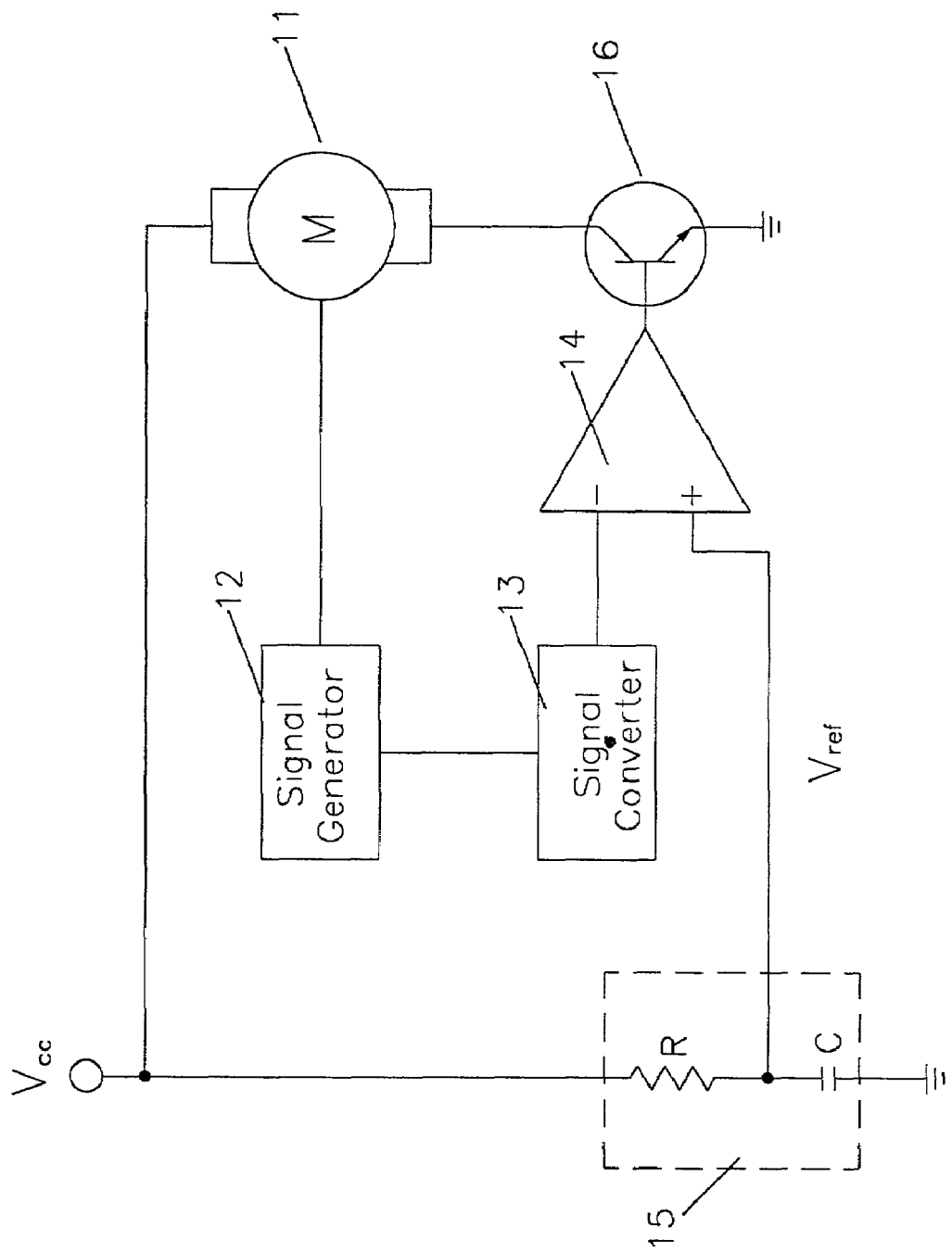
FIG. 1 is a schematic diagram showing a preferred embodiment of the starting device according to the present invention.

The present invention provides a starting device for eliminating a peak current introduced when an inductive circuit such as a motor or a direct-current (DC) motor is actuated. For the sake of convenience, the inductive circuit is exemplified by a direct-current (DC) motor. Please refer to FIG. 1 which shows a preferred embodiment of the starting device of the present invention. The starting device includes a signal generator 12 electrically connected to the motor 11 and generating a first signal corresponding to a signal output by the motor 11, a comparative circuit electrically connected to the signal generator 12 for converting the first signal to a second signal to be compared with a reference signal to generate a control signal, and a controlling device 16 electrically connected with the motor 11 and the comparative circuit for receiving the control signal and gradually increasing a current flowing through the motor corresponding to the control signal, thereby eliminating the peak current introduced when the motor is actuated.

The signal generator 12 is preferably a frequency generator which can generate a periodic square-wave signal (that is, the first signal) in accordance with the rotation speed of the motor. Therefore, the frequency of this periodic square-wave signal is proportional to a rotation speed of the motor.

The comparative circuit includes a signal converter 13 and a comparator 14. The signal converter 13 is electrically connected to the signal generator 12 and can be a triangular wave generating circuit for converting the square-wave signal to a triangular wave signal or a sawtooth wave signal to be compared with a reference signal Vref (or called a target basic voltage). The comparator 14 is electrically connected to the signal converter 13 for comparing the triangular wave signal or the sawtooth wave signal with the reference signal to output a pulse width modulation (PWM) signal (or a control signal). The reference signal is provided by a charging circuit or a resistance-capacitance circuit 15 electrically connected between the comparator 14 and a voltage source Vcc for supplying a required voltage for the motor The controlling device can be an electronic switch, preferably a transistor 16, for gradually increasing the current flowing through the motor 11 after receiving the PWM signal, thereby eliminating the peak current introduced when the motor 11 is actuated and further controlling the rotation speed of the motor 11.

Figure 2:
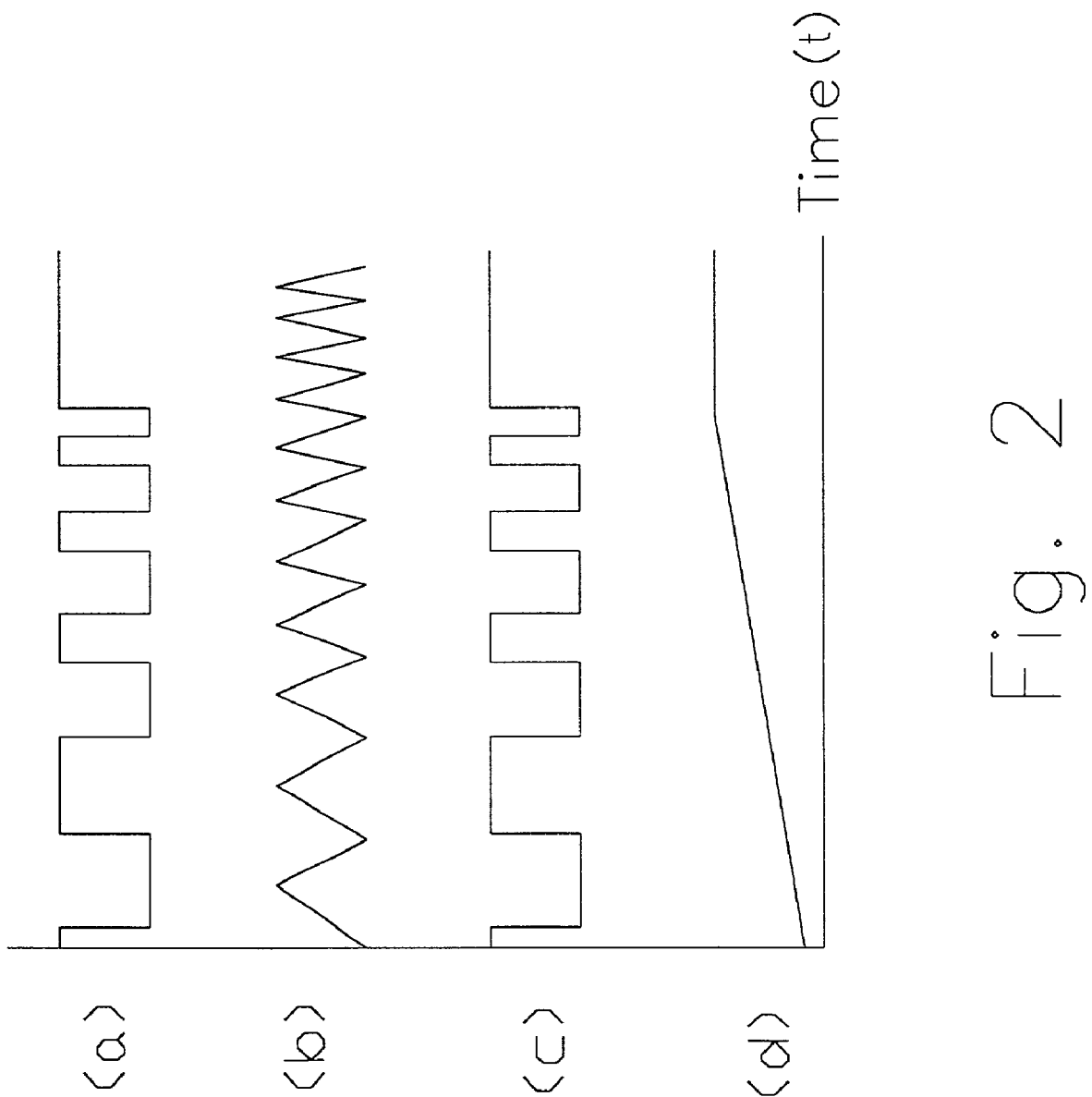
FIG. 2 shows the relationship between the conversion and variation of the generated signals and the rotation speed of motor in the starting device of the present invention.

In order to detailedly illustrate the relationship between the conversion and variation of each generated signal and the rotation speed of motor in the starting device of the present invention, please refer to FIG. 2. The FG signal generated by the frequency generator 12 is a periodic square-wave signal (shown as the waveform (a) in this figure) having the frequency proportional to a rotation speed of the motor. After the periodic square-wave signal is converted to a triangular wave signal or a sawtooth wave signal (shown as the waveform (b) in this figure) by the triangular wave generating circuit 13, the triangular wave signal can be input into the comparator 14 to be compared with the reference signal $V_{ref}$ provided by the resistance-capacitance circuit 15. According to the compared result, the comparator 14 output the PWM signal (shown as the waveform (c) in the figure) to the transistor 16. When the PWM signal is received by the transistor 16, the motor 11 is started to rotate; while the input PWM signal disappears (that is to say, the state of PWM signal is changed from a relatively high voltage level to a relatively low voltage level), the transistor is switched to a close status but the motor can continuously rotate for a period of time due to inertia. Therefore, the switching status of the transistor can be used to control the current provided for the motor so that the rotation speed of the motor can be gradually increased until the motor is rotated at a full speed (as shown in (d) of FIG. 2). By such a simplified circuit design, the peak current introduced when the motor is actuated can be effectively eliminated.

Figure 3:
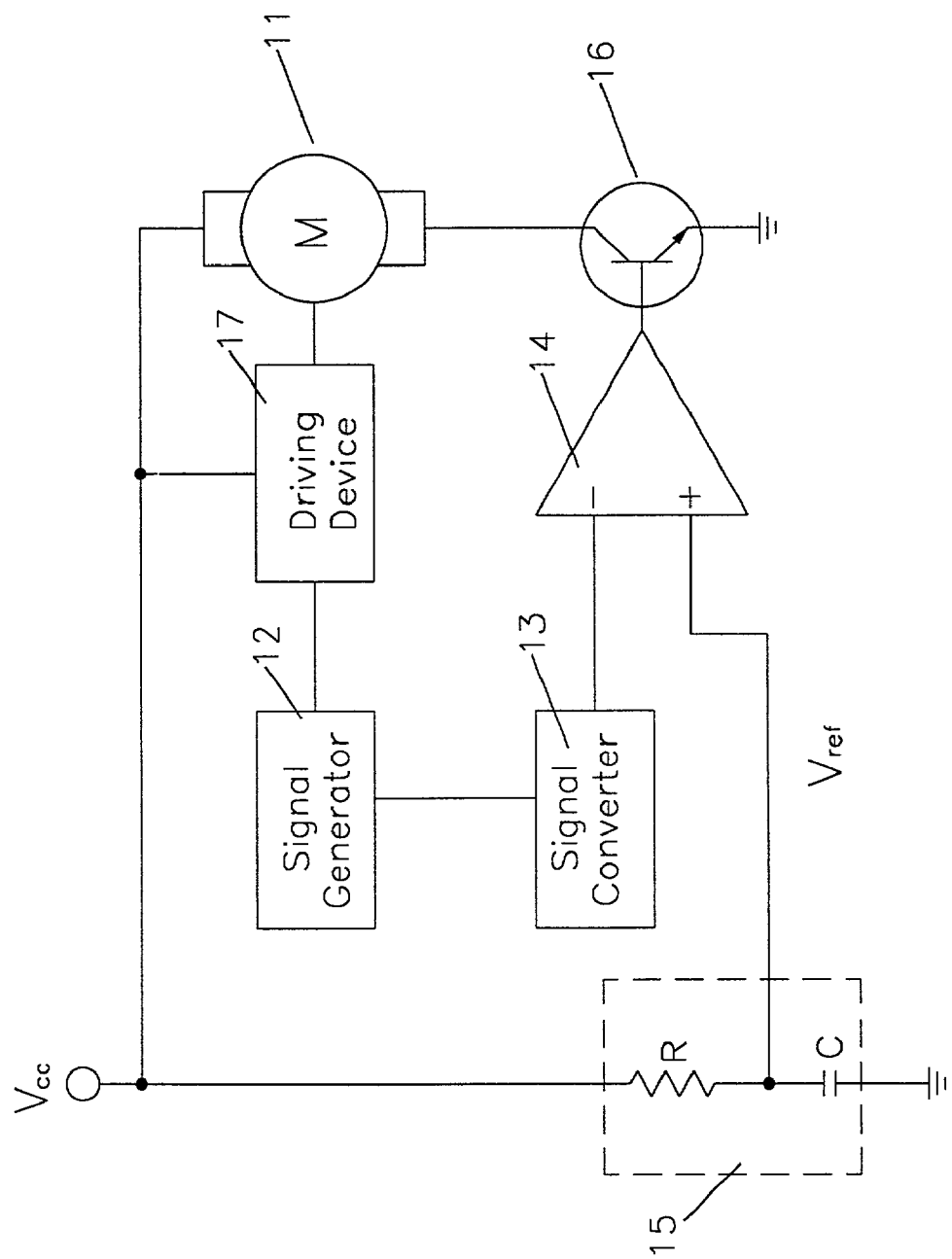
FIG. 3 is a schematic diagram showing another preferred embodiment of the starting device according to the present invention.

In addition, please refer to FIG. 3 which shows another preferred embodiment of the starting device according to the present invention. Its structure and operating principle are almost identical to those shown in FIG. 1 except that the starting device further includes a driving circuit electrically connected between the motor 11 and the signal generator 12 for driving the motor 11.

To sum up, the present invention provides a simplified and cheap circuit design for the starting device used to eliminate a peak current introduced when the motor is actuated such that the current provided for the motor can be controlled and the rotation speed of the motor can be gradually increased when it is started, thereby significantly eliminating the occurrence of peak current to prevent the internal device of the motor or any electric device connected with the motor from being damaged.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A starting device for eliminating a peak current introduced when an inductive circuit is actuated, comprising:
    a signal generator electrically connected to said inductive circuit and generating a first signal corresponding to a signal output by said inductive circuit;
    a comparative circuit electrically connected to said signal generator for converting said first signal to a second signal to be compared with a reference signal to generate a control signal; and
    a controlling device electrically connected with said inductive circuit and said comparative circuit for receiving said control signal and gradually increasing a current flowing through said inductive circuit corresponding to said control signal, thereby eliminating said peak current introduced when said inductive circuit is actuated.

2. The starting device according to claim 1 wherein said inductive circuit is a motor.

3. The starting device according to claim 2 wherein said signal generator is a frequency generator.

4. The starting device according to claim 3 wherein said first signal is a periodic square-wave signal.

5. The starting device according to claim 4 wherein said periodic square-wave signal has a frequency proportional to a rotation speed of said motor.

6. The starting device according to claim 4 wherein said comparative circuit includes:
    a signal converter electrically connected to said signal generator for converting said first signal to said second signal; and
    a comparator electrically connected to said signal converter and said controlling device for comparing said second signal with said reference signal to output said control signal.

7. The starting device according to claim 6 wherein said signal converter is a triangular wave generating circuit for converting said square-wave signal to one of a triangular wave signal and a sawtooth wave signal.

8. The starting device according to claim 6 further comprising a charging circuit electrically connected between said comparator and a voltage source for supplying said inductive circuit with a required voltage, and providing said reference signal.

9. The starting device according to claim 8 wherein said charging circuit is a resistance-capacitance circuit.

10. The starting device according to claim 2 wherein said control signal is a pulse width modulation (PWM) signal for controlling a rotation speed of said motor.

11. The starting device according to claim 10 wherein said controlling device is an electronic switch for gradually increasing said current flowing through said inductive circuit corresponding to said PWM signal.

12. The starting device according to claim 11 wherein said electronic switch is a transistor.

13. The starting device according to claim 1 further comprising a driving circuit electrically connected between said inductive circuit and said signal generator for driving said inductive circuit.

14. A starting method for eliminating a peak current introduced when an inductive circuit is actuated, comprising the steps of:
 (a) providing a first signal corresponding to a signal output by said inductive circuit;
 (b) converting said first signal to a second signal to be compared with a reference signal for generating a control signal; and
 (c) gradually increasing a current flowing through said inductive circuit corresponding to said control signal, thereby eliminating said peak current introduced when said inductive circuit is actuated.

15. The starting method according to claim 14 wherein said inductive circuit is a motor.

16. The starting method according to claim 15 wherein said first signal is a periodic square-wave signal.

17. The starting method according to claim 16 wherein said periodic square-wave signal has a frequency proportional to a rotation speed of said motor.

18. The starting method according to claim 16 wherein said step (b) is performed by a triangular wave generating circuit to convert said square-wave signal to one of a triangular wave signal and a sawtooth wave signal.

19. The starting method according to claim 15 wherein said control signal is a pulse width modulation (PWM) signal for controlling a rotation speed of said motor.

20. The starting method according to claim 19 further comprising a step of repeating said steps (a) to (c) to gradually increase said rotation speed of said motor until said motor is rotated at a full speed.

* * * * *